United States Patent
Claassen

(10) Patent No.: US 6,647,363 B2
(45) Date of Patent: Nov. 11, 2003

(54) METHOD AND SYSTEM FOR AUTOMATICALLY VERBALLY RESPONDING TO USER INQUIRIES ABOUT INFORMATION

(75) Inventor: Antonius M. W. Claassen, Lent (NL)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 09/414,459

(22) Filed: Oct. 7, 1999

(65) Prior Publication Data

US 2003/0125926 A1 Jul. 3, 2003

(30) Foreign Application Priority Data

Oct. 9, 1998 (EP) .............................................. 98203423

(51) Int. Cl.⁷ .......................... G06F 17/20; G06F 17/28; G01L 11/00
(52) U.S. Cl. ................................ 704/1; 704/9; 704/275
(58) Field of Search .......................... 704/1, 9, 10, 270, 704/272, 275; 705/26; 379/88.01, 88.04, 88.16, 88.18

(56) References Cited

U.S. PATENT DOCUMENTS

| 5,479,564 A | | 12/1995 | Vogten et al. ............... 704/267 |
| 5,485,507 A | * | 1/1996 | Brown et al. ............. 379/88.08 |
| 5,577,165 A | * | 11/1996 | Takebayashi et al. ....... 704/275 |
| 5,634,083 A | | 5/1997 | Oerder ........................ 704/253 |
| 5,694,558 A | * | 12/1997 | Sparks et al. ............... 345/326 |
| 5,745,877 A | | 4/1998 | Nijmam et al. ............. 704/270 |
| 5,983,200 A | * | 11/1999 | Slotznick ...................... 705/26 |
| 5,999,904 A | * | 12/1999 | Brown et al. ............... 704/272 |
| 6,035,275 A | * | 3/2000 | Brode et al. ................ 704/275 |
| 6,044,347 A | * | 3/2000 | Abella et al. ............... 704/272 |
| 6,073,102 A | * | 6/2000 | Block ......................... 704/275 |
| 6,108,640 A | * | 8/2000 | Slotznick ...................... 705/26 |
| 6,144,938 A | * | 11/2000 | Surace et al. ............... 704/257 |
| 6,192,110 B1 | * | 2/2001 | Abella et al. ............ 379/88.01 |
| 6,246,981 B1 | * | 6/2001 | Papineni et al. ............ 704/235 |
| 6,262,730 B1 | * | 7/2001 | Horvitz et al. .............. 345/337 |
| 6,311,159 B1 | * | 10/2001 | Van Tichelen et al. ..... 704/275 |

OTHER PUBLICATIONS

"Development of the INRS ATIS System", by C. Yang et al, Proceedings of the 1993 International Workshop on Intelligent User Interfaces, Jan. 4–7, 1993, pp. 133–140.

"Dialog in the Railtel Telephone–Based System", Proceedings ICSLP 1996, vol. 1, pp. 550–553.

* cited by examiner

Primary Examiner—Patrick N. Edouard
(74) Attorney, Agent, or Firm—Bromberg & Sunstein LLP

(57) ABSTRACT

A system is presented for automatically responding to a user inquiry comprising a dialog manager and a presentation manager. The dialog manager executes a machine-controlled human/machine dialog to determine a set of query items, and in response thereto, retrieves information items from memory. The presentation manager determines the inquiring user's intentions motivating and associated with the query, and in response thereto selects a preferred manner of presenting the retrieved information items, or presentation scenario. In so doing, at least one natural language phrase is generated to match the selected presentation scenario, and a speech generator verbally presents the generated phrasing to the inquiring user.

13 Claims, 2 Drawing Sheets

METHOD AND SYSTEM FOR AUTOMATICALLY VERBALLY RESPONDING TO USER INQUIRIES ABOUT INFORMATION

BACKGROUND OF THE INVENTION

1. Field of the Invention

The invention relates to a method for automatically responding to an inquiry from a user; the method comprising:

executing a machine-controlled human-machine dialogue to determine a plurality of pre-determined query items specifying information to be verbally presented to the user;

retrieving a plurality of information items from a storage in dependence on the query items;

generating at least one natural language phrase to present the obtained information items according to a presentation scenario; and verbally presenting the generated phrase(s) to the user.

The invention further relates to a system for automatically responding to an inquiry from a user; the system comprising:

means for executing a machine-controlled human-machine dialogue to determine a plurality of pre-determined query items specifying information to be verbally presented to the user;

means for retrieving a plurality of information items from a storage in dependence on the query items;

means for generating at least one natural language phrase to present the obtained information items according to a presentation scenario; and means for verbally presenting the generated phrase(s) to the user.

2. Description of the Related Art

Automatic inquiry systems, for instance for obtaining traveling information, increasingly use automatic human-machine dialogues. Typically, a user establishes a connection with the inquiry system using a telephone. In a free-speech dialogue between the machine and the user, the machine tries to establish a number of query items required to obtain the desired information from a storage, such as a database. During the dialogue, the system typically issues an initial question. For a travelling information system, such an initial question might be "From which station to which station would you like to travel ?". During the following dialogue, the system uses speech recognition techniques to extract query items from the user's utterances. For example, an automatic public transport information system needs to obtain the departure place, the destination place and a desired time/date of traveling to perform a query. The system may issue verifying/confirming statements to verify that it correctly recognized a query item. To establish query items for which no text has been recognized yet, the system may issue explicit questions, like "When would you like to leave ?". The question may also be combined with a verifying statement. For example, in a situation where Amsterdam has been recognized as the departure place, but a departure time or specific departure station in Amsterdam is still unknown, the system could ask: "When would you like to leave from Amsterdam Central Station?". Once all its essential query items have been recognized, the answers to the query are obtained from a storage. This results in a collection of information items, which are to be presented to the user in spoken form. Normally, textual presentations of the information items are inserted in a sequence of preformatted phrase or sentence templates, referred to as a presentation scenario. Usually, the templates are prosodically enriched. If no suitable speech presentation is available, for instance in the form of sampled phrases/words, the prosodically enriched text may be converted to speech using a speech synthesis technique. The speech output is fed back to the user. Depending on the nature of information items to be presented, a suitable presentation scenario may be chosen from a predetermined collection of scenarios. For instance, a different scenario may be used for any of the following situations:

no suitable connection was found, one connection was found, more than one connection was found, the connection involves no changing over the connection involves one change the connection involves multiple changes.

Traditionally, inquiry systems were operated by human operators. The operator performed a dialogue with a user and entered query items into the system. The operator then performed a database query, and the results were displayed on a screen. The operator then read out the requested information to the user. The traditional inquiry systems tended to be self-centered or oriented towards the operator and lacking orientation towards the end-user. Automatic inquiry systems were build around these systems by adding a dialogue function and a presentation function. This sometimes exposed the lack of user-orientation of the system in the form of rigid or menu driven dialogue schemes.

From "Dialog in the RAILTEL Telephone-Based System", Proceedings ICSLP 1996, Vol.1, pp.55–553, it is known that it is desired to take the user's intention into consideration during the human-machine dialogue. This may improve the recognition rate as well as confirmation process during the dialogue. It may also improve the selection process during the dialogue for systems wherein the user may choose between several sets of information items (e.g. information relating to a train or to a bus; main time table information, information relating to delays, etc) or may choose between several services, like presenting information or acting as an automated telephone switchboard.

SUMMARY OF THE INVENTION

It is an object of the invention to provide a method and system of the kind set forth, which is more user oriented, enhancing the acceptance of an automatically operating inquiry system.

To achieve the object, the method is characterized in that the method comprises, based on utterance(s) of the user, determining an intention of the user from a predetermined set of intentions; the intention reflecting a preferred way of presenting the information items; and selecting the presentation scenario from a predetermined set of presentation scenarios in dependence on the determined intention.

The inventor has realized that in many human-machine dialogues information is present, either explicitly or implicitly, that enables the system to determine or to infer certain intentions of the user that influence the way the information is to be presented most effectively. For instance, in many situations it is possible to derive from the dialogue, which of the information items retrieved during the query, are important to the user. In train travel information inquiries in general, the departure time will usually be of primary interest, allowing the user to determine when he should arrive at the departure station. However, if a user indicates that he wishes to travel from A to B and arrive around 9 A.M., it may be assumed that he is also very much interested in the exact arrival time at the station of destination. At least more so, when compared to users who ask for a connection from A to B that leaves around 9 A.M. Mentioning the arrival time early in the presentation will allow the user to check whether the arrival time of the connection indeed corresponds with his request, and to discard the incoming information if it does not. By choosing a presentation scenario which is tailored to the intention of the user, instead of selecting a scenario solely based on the information obtained as a result of the query, the user will feel more appreciated by the system. Consequently, the acceptance of the system will increase.

In systems which allow the user access to different sets of information or offer several services, the dialogue will normally involve determining in which set of information or in which service the user is interested. Such determining of the intention and acting upon it is not the subject of the invention. The invention relates to determining the intentions of the user that influence the way in which certain information items are presented effectively, and not to determining which set of information items or service the user wants to have access to.

In many cases it is not desired to pose additional questions to the user during the dialogue phase in order to determine intentions of the user that affect the way the information is presented most effectively. This will prolong the dialogue phase whereas at that moment it may not even be sure that the desired information is available at all. For instance, explicitly asking whether the user is most interested in the arrival time or departure time of a train/bus is probably annoying if the outcome of the query is that no train or bus is available regardless of the arrival/departure time.

In an embodiment as defined in the dependent claim 2, it is determined which of the information items is/are relatively important to the user. The user may explicitly express which item(s) is/are important. For instance, a user may say "I would like to know the arrival time of a train to Y leaving X around 8 P.M". From this utterance, it can be concluded that the arrival time is of most importance. The user may also implicitly indicate which item is important. For instance, from the utterance "I have a meeting at 10 A.M. in Y. What is the most suitable train leaving from X?", it may be concluded that the exact arrival time is more important than the departure time. A presentation scenario is chosen which reflects the relative importance of the information items. In a preferred embodiment as defined in the dependent claim 4, more important items are presented relatively early in the presentation. For instance, if the departure time is most important, the output sequence could be "There's a train (leaving X) at 7.15 P.M. It will arrive in Y at 7.55". If the arrival time is most important, the sentence could be "There's a train arriving in Y at 7.55 P.M. It will leave X at 7.15". It will be appreciated that the most important item needs not be presented as the first information item in absolute terms. With the exception from discourse initial sentences, in coherent natural language discourse, sentence initial phrases often present information that is given. They serve to link the upcoming, new information with an information element that has been established in the preceding discourse. Other techniques for emphasizing an item may also be employed. For example, by using certain marked constructs or phrases, possibly in combination with sentence accent. E.g., when a user inquires whether he can get from A to B after 0.30 A.M. the system could answer: "There's only a stopping train leaving at 0.35 AM" to indicate the contrast with the intercity trains that are available earlier during the day.

According to an embodiment as defined in the dependent claim 3, an information item is regarded important if a corresponding query item occurred relatively early in the utterances of the user. For instance if the query item specifying the desired departure-time was recognized relatively early, the corresponding information item with the exact departure time is regarded as important.

In an embodiment as defined in the dependent claim 5, the intention is determined from a response to the user to question and/or verifier statements of the machine. The intention may be derived from the way or the moment in which the user specifies query items. The intention may also be recognized independently from the query items. For instance, the intention may be derived from items recognized in the response but not required for the query.

In an embodiment as defined in the dependent claim 6, the intention of the user is recognized analogous to recognizing the query items. Both the query items and the intentions (also referred to as intention items) are established recognizing the associated keywords/phrases in the utterance(s) of the user. The recognized query items are used to retrieve the desired information, e.g. by performing a database query. The recognized intention items are used to select the most appropriate presentation scenario. It will be understood that an overlap may exist between the query items and the intention items. This may be particularly the case if a query can be specified in various forms, e.g. for a valid query it may be required to recognize items for the departure station and the destination station, where a time may be specified by either a departure time or an arrival time. Which of the time items has been filled can be used to indicate the intention of the user. As such, the query items can contain information, which expresses an intention of the user that is relevant for the way the information is presented most effectively. If two or more intentions have been recognized, the most important one may be selected, for instance on the basis of a fixed priority scheme, where the intentions as reflected by the intention items are ranked with respect to importance.

In an embodiment as defined in the dependent claim 7, a default presentation scenario is selected if no intention has been recognized (i.e. no intention specifier has been filled).

In an embodiment as defined in the dependent claim 8, the user is allowed to barge-in during the presentation. From a barging-in utterance, like "when does it arrive ?" it becomes clear that the user is particularly interested in the arrival time. In response, a scenario emphasizing the arrival time may be chosen. The intention may also be derived from the moment of barging-in, possibly in combination with the barging-in utterance. Particularly, since it is difficult to recognize the beginning of a barging-in utterance, the moment of barging-in can help in determining the intention. For instance, from a reply "No, not that" in combination with the fact that just at that moment for the first time a change-over has been presented, it can be concluded that it is the intention of the user not to change over at all or not to receive detailed changing-over information. Similarly, if the moment of barging-in was after presenting a second or third change-over, it can be concluded that the user does not like changing frequently. It will be appreciated that the original presentation, which started at the end of the dialogue, may be based on a default presentation scenario. This may happen, for instance, if no intention or more suitable scenario could be determined from the initial responses of the user. If the user barges in during the presentation, the intention of the user for barging-in is determined. In many cases, a more suitable presentation scenario can be located to overcome any objections which may have been expressed. This may involve withholding some of the information which is available (e.g. only give detailed departure and arrival information and limited or no changing-over information). It will be appreciated that information which has been presented before the moment of barging-in need not, but may be, repeated according to the new scenario.

In an embodiment as defined in the dependent claim 9, based on the information items to be presented, a judgement is made whether a presentation scenario might give too complex/long output sentence(s). If so, the user is contacted in order to choose a more appropriate scenario. For instance, if the database query produced a trip with two change-overs, a combined response/question may be given to the user, like "A train connection exists leaving A at 8.00 AM and arriving at B at 10.30 AM. The connection involves a change-over in C and D. Would you like the change-over times?". In dependence on the response, like "Yes, please", or "Yes, full details please", a choice may be made between presenting only the change-over times, presenting only departure times at the intermediate stations, or presenting details of each trajectory in full (departure/arrival station and time).

In an embodiment as defined in the dependent claim 10, a distinction is made between the intention of the user to write down or not to write down the information which is presented. Particularly when the user intends to write the output down, it is preferred to present the information in small sentences/phrases, at a relatively low pace and sufficient time in between the sentences/phrases. Particularly, if the information to be presented is of a repetitive nature, it is preferred to use phrases/sentences which allow a user to easily write the information down in table form. For example, if a trip involves changing-over, the trajectories are preferably presented in a short form, which is similar for each trajectory, like "The train leaves A at 8.00 P.M., and arrives in B at 8.30. The connecting train leaves B at 8.45 and arrives in C at 9.30". For certain queries it can safely be assumed that the user wants to write down the information. For example, if the user inquires after a journey which lies relatively far in the future (e.g. two weeks or more) or for international journeys.

In an embodiment as defined in the dependent claim 11, it is preferred for a travelling information system to distinguish between the intention of the user to arrive at a certain time, to depart at a certain time, or to have ample time for changing-over.

To meet the object of the invention, the system is characterized in that the system comprises means for determining an intention of the user from a predetermined set of intentions based on utterance(s) of the user; the intention reflecting a preferred way of presenting the information items; and means for selecting the presentation scenario from a predetermined set of presentation scenarios in dependence on the determined intention.

BRIEF DESCRIPTION OF THE DRAWINGS

These and other aspects of the invention will be apparent from and elucidated with reference to the embodiments shown in the drawings.

DETAILED DESCRIPTION OF THE PREFERRED EMBODIMENTS

Figure 1:
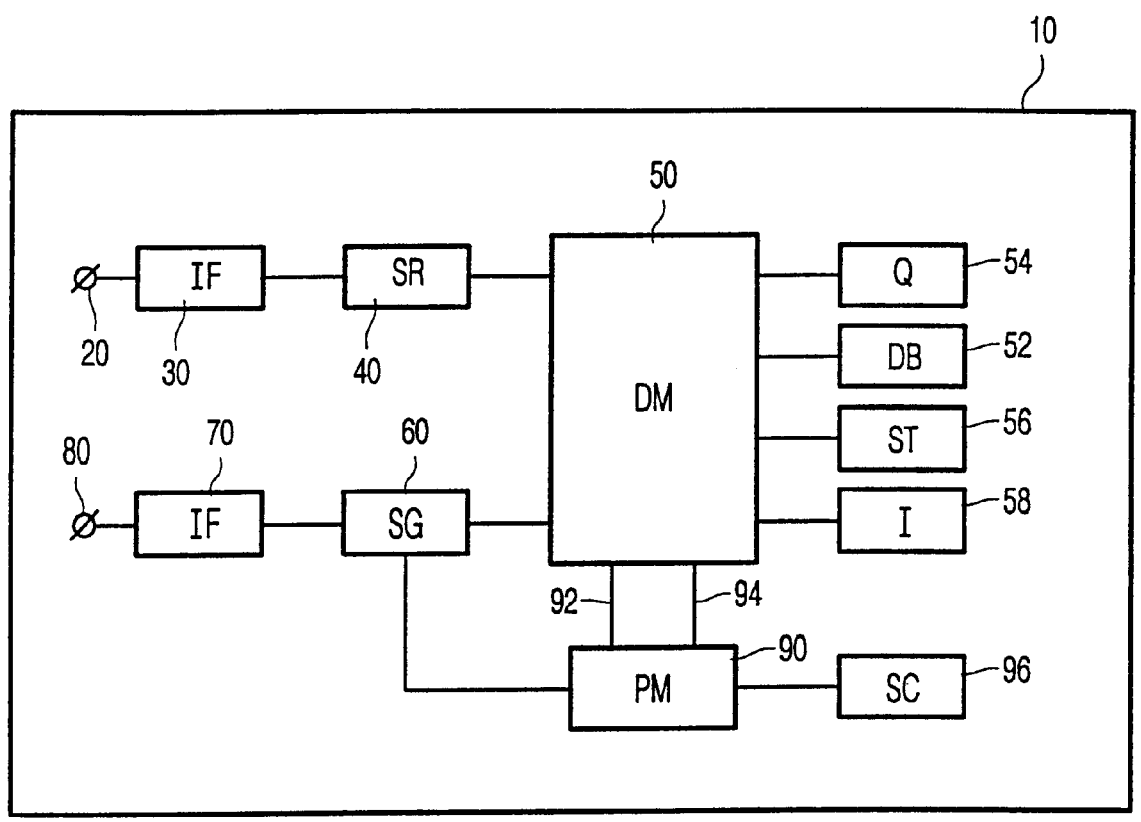
FIG. 1 shows a block diagram of a system according to the invention.

FIG. 1 shows a block diagram of a system 10 according to the invention. Examples of the working of the system will be described in particular for a system which automatically provides information with respect to train schedules. It will be appreciated that these examples are not limiting. The system may equally well be used for supplying information with respect to other journey scheduling information, such as involving a bus or plane. Moreover, the system may be used to supply other types of information, such as bank related information (e.g. an account overview), information from the public utility boards, information from the council or other governmental organizations, or, more in general, information related to a company (e.g. product or service information).

In the figure, item 20 represents an interconnection for receiving a speech representative signal from a user. For instance, a microphone may be connected to the interconnection 20. Typically such a microphone is integrated in a telephone, allowing the user to operate the system remotely. The system comprises an interface 30 to receive the input from the user. This may for instance be implemented using a conventional modem. If the interface has an input for receiving speech in an analogue form, the interface preferably comprises an A/D converter for converting the analogue speech to digital samples of a format suitable for further processing by a speech recognition system 40. If the interface has an input for receiving the speech in a digital form, e.g. via ISDN, preferably the converter is capable of converting the digital data to a suitable digital format for further processing. Block 40 represents a speech recognition subsystem. The speech recognition system 40 typically analyses the received speech by comparing it to trained material (acoustical data and a lexicon/grammar). The speech recognition is preferably speaker-independent. The speech recognition system 40 may output a recognized stream of words. Preferably, the speech recognition system 40 outputs a word graph, containing several likely sequences of words which may have been spoken by the user. It is preferred to use a continuous speech recognizer. By itself, speech recognition is known and has been disclosed in various documents, such as EP 92202782.6, corresponding to U.S. Ser. No. 08/425,304 (PHD 91136), EP 92202783.4, corresponding to U.S. Ser. No. 08/751,377 (PHD 91138), EP 94200475.5, corresponding to U.S. Pat. No. 5,634,083 (PHD 93034), all to the assignee of the present application.

The output of the speech recognition subsystem 40 is fed to a dialogue management subsystem 50. The dialogue manager 50 forms the core of the system 10 and contains application specific information. The dialogue manager 50 is programmed to determine in which information the user is interested. To this end, the dialogue manager 50 scans the output of the speech recognizer in order to extract key-words or phrases which indicate which information the user wishes to obtain. The key words or phrases to be searched for may be stored in a storage 54, such as a hard disk. The extracted information elements, referred to as query items, are typically stored in main memory (not shown). Once all the items of a query have been recognized, the information is obtained from a storage 52, which usually is based on a database. The dialogue manager 50 may support only one query type for instance in the situation where only one set of information items can be obtained. In many cases, it may be possible to specify alternative queries. For instance, a train journey can be specified by the destination station, the arrival station and in addition either the desired departure or arrival time. Some systems may also allow a user to obtain different sets of information, like information on a specific train journey or information on delays or railway maintenance. In these situations, the dialogue manager 50 preferably is capable of identifying information for more than one query type. As soon as all the essential items of one query of a certain type have been recognized, the dialogue is finished and the query can be performed. Normally, a dialogue is initiated by the dialogue manager 50 triggering the issuing of a predetermined welcome statement. If all the query items can be extracted from the initial user response, the dialogue may be completed after the first user response. If not all query items were recognized in the first user response, one or more sub-dialogues may be started to determine the missing items. A sub-dialogue usually starts with a question statement. The question statement may be combined with a confirmation statement, to confirm already recognized items. If a.user rejects an item already recognized, the rejected item may be redetermined, for instance from the rejection utterance, from less likely alternatives derived from previous utterances or by starting a new sub-dialogue. Particularly at the end of the dialogue, all the query items that have been recognized may be confirmed by issuing a confirmation statement. The request/confirmation statements typically are formed from predetermined sentences/phrases, which may be stored in a background storage 56. A template sentence/phrase may be completed by the dialogue manager 50 filling in information believed to have been recognized in utterances of the user. For instance, the dialogue manager could form a question/confirmation statement like "When would you like to leave station X", where station X has been recognized in a previous utterance. Also other variable information, such as current date or time, may be filled in. In itself dialogue managers are known, for instance from EP 96900010.8 corresponding to U.S. Pat. No. 5,745,877 (PHN 15167), IB 97/00284 (PHN 15779), IB 98/00006 (PHN 16166), IB 97/00173 (PHN 15871) all to the present assignee.

The system 10 further comprises a speech generation subsystem 60. The speech generation subsystem 60 may receive the question/confirmation statements from the dialogue manager 50 in various forms, such as a (potentially prosodically enriched) textual form or as speech fragments. The speech generation subsystem 60 may be based on speech synthesis techniques capable of converting text-to-speech. The speech generation subsystem 60 may itself prosodically enrich the speech fragments or text in order to generate more naturally sounding speech. The enriched material is then transformed to speech output. Speech generation has been disclosed in various documents, such as IB 96/00770 (PHN 15408), IB 96/01448 (PHN 15641), U.S. Pat. No. 5,479,564 (PHN 13801), all to the assignee of the present application. Via the interface 70 the speech output is provided to the user at the speech output interconnection 80. Typically, a loudspeaker is connected to the interconnection 80 for reproducing the speech output. Preferably, the loudspeaker forms part of the telephone used for the speech input. The speech output interface 70 is usually combined with the speech input interface 30 in a known manner, for instance in the form of a modem.

According to the invention, the system 10 comprises a presentation manager 90. The dialogue manager 50 supplies the information retrieved from the storage 52 to the presentation manager 90 via an interface 92. The presentation manager 90 selects a presentation scenario, such as a template sentence/phrase. The scenarios from which the presentation manager 90 can choose are typically stored in a storage 96, such as a hard disk. The scenario is filled in using the information supplied by the dialogue manager 50, such as for instance the actual departure/arrival times. The completed sentence/phrase is supplied to the speech generation system 60 for presentation to the user as speech. Preferably, the generation technique is identical to the technique used to present the question/confirmation statements. It will be appreciated that a presentation scenario may involve a number of sentences/phrases, particularly if many information items need to be presented. The selection of a presentation scenario may be influenced by the actual information obtained from the storage, like: no trains available, a direct connection found or a journey found which involves changing-over, etc. According to the invention, the selection of a suitable presentation scenario is entirely or additionally based on an intention of the user that affects the way the information is presented most effectively. The intention is determined during the dialogue based on utterance(s) of the user. The dialogue manager 50 determines an intention of the user from a predetermined set of intentions. The intention may be determined or inferred in many ways. For instance, an intention may be reflected by which query items have been provided, e.g. an approximate arrival time or departure time. Such intention information may be passed from the dialogue manager 50 to the presentation manager 90 via the interface 94 in the form of which type of query was used, or which individual query items have been filled. Also temporal information about the query items, such as the sequential order in which the respective items were recognized, can reflect the intention of the user. To this end, information may be passed via the interface 94 indicating the order in which the query items were recognized. The presentation manager 90 determines a prime intention of the user from the provided information. For instance, in the situation where the dialogue manager 50 informs the presentation manager 90 which query type has been applied, the dialogue manager 50 can simply select an intention and an associated presentation scenario for each of the possible query types. The selection may simply be based on a table which maps the possible query types to the set of presentation scenarios. A similar technique may be used for the situation in which order information of the query items is provided. In this case, the order information may be compared to some frequently occurring orders to determine a most likely one, where each sequence is associated with a presentation scenario.

According to the invention, for at least one given set of information items retrieved from the storage 56 at the request of the user, the system has a choice between alternative presentation scenarios. The choice may for instance be between two or more scenarios which each present the same information items but with a different sequence of presenting the items. Examples are:

"There's a train leaving at 7.15 P.M. It arrives in Y at 7.55", or
"There's a train arriving in Y at 7.55 P.M. It leaves at 7.15".

The choice may also lie in presenting the information in one sentence/phrase or using a series of smaller sentences/phrases, possibly with a repetition of information. Examples are:

"Leave X at 7.15 P.M., arrive in Y at 7.55, leave Y at 8.15, and arrive in Z at 8.45", or
"There's a train at 7.15 P.M It arrives in Y at 7.55. A connecting train leaves at 8.15 and arrives in Z at 8.45", or "There's a train at 7.15 P.M. It arrives in Y at 7.55. A connecting train leaves Y at 8.15. The connecting train arrives in Z at 8.45".

The choice between scenarios may also lie in the amount of detail provided, possibly leaving out information obtained from the storage. For example:

"The train leaves X at 7.15 P.M, arriving in Y at 7.55. A connecting train leaves at 8.15, arriving in Z at 8.45", or "The train leaves X at 7.15 P.M, arriving in Y at 7.55. A connecting train arrives in Z at 8.45".

In a preferred embodiment, determining an intention of the user comprises determining which of the information items is/are important to the user. In a system where the intention is derived from the query information, this may be achieved by nominating an information item as important if a corresponding query item occurred early in a utterance(s) of the user compared to the other query items. This may be implemented by comparing the sequence in which query items have been recognized with one or more default sequences. If a query item has been recognized earlier than in those default sequences, the information relating to that item is considered important. It will be appreciated that which items are important can also be derived from explicit/implicit utterances of the user which are not reflected by the query items. It is preferred that the presentation manager 90 selects a scenario from the predetermined set of presentation scenarios. A scenario is selected in which the important information item(s) is/are presented early with respect to the other obtained information items, and in which relatively unimportant information items are presented late, or are not presented at all. In some scenarios very important information items may even be presented twice.

In a preferred embodiment, the dialogue manager 50 preferably extracts certain intentions from the utterances of the user. To this end, the dialogue manager 50 scans the output of the speech recognizer 40 in order to extract key-words or phrases which reflect an intention of the user that affects the way the information is presented most effectively. In a travel information system, a keyword such as 'fast', 'detail', 'overview', and a phrase such as 'is there a train from A to B after X'o clock', etc. can indicate intentions of the user which can be reflected in a presentation scenario. For instance, 'fast' and 'overview' may be associated with a brief and to the point presentation scenario, 'detail' may be associated with a scenario in which all available information is presented in full detail, and 'is there a train from A to B after X'o clock' may trigger a scenario in which only the departure time is mentioned. Preferably, the dialogue manager 50 uses the same technique to detect both the query items and the user intentions in the recognized stream provided by the speech recognizer 40. To this end, the key-words or phrases associated with intention specifiers may be stored in a storage 58, such as a hard disk. The extracted intentions are typically stored in main memory (not shown). Once the dialogue has been completed, the intention specifiers are supplied to the presentation manager 90 via the interface 94. If for only one intention specifier an intention has been recognized, the presentation manager 90 selects one of the presentation scenarios associated with this specifier. It will be appreciated that also the query items may be used to determine the intention of the user, as has been described above. So, if more than one intention has been recognized or if the query items also provide intention information, the presentation manager 90 preferably selects a scenario which best matches an item which is considered the most important one (i.e. has highest priority). The selection may be performed by assigning one of the scenarios to each of the possible intentions. As an alternative, the presentation manager 90 may also select a scenario which best matches some or all of the recognized intentions. This may, for instance, be achieved by indicating for each possible intention how well each of the scenarios fits the intention. For the indication a scale from 0 to 1 may be used, where 0 indicates that the scenario is not at all applicable for the recognized intention and 1 indicates that the scenario is highly applicable. By accumulating the scores for all scenarios based on the recognized intentions, the scenario with the highest accumulated score is preferably selected as probably best representing the intention(s) of the user.

It will be appreciated that at the moment a query has been recognized, not always a specific intention of the user for having access to the specified information may have been recognized. In this case, the presentation manager 60 preferably selects a default presentation scenario and presents the information according to this scenario. The scenario may be is selected only on the basis of the information to be presented (e.g. yes or no change-over). In a preferred embodiment the system is capable of detecting barging-in of the user during the presentation of the retrieved information. Any suitable barge-in detection method may be used, such as based on measuring input energy levels, if desired relative to the energy output which results from presenting the information to avoid mistaking a change in the output energy (which is received back via the input) as a user barging-in. If barging-in is detected, this provides information to the system from which an intention of the user may be derived. The intention may be derived from recognizing the barging-utterance of the user. For instance, if the user says "No, not that fast", or "Less details please", this may indicate that the user prefers a presentation scenario which presents the information in shorter pieces or with less detail, allowing the user to write down the information. Such intentions can be recognized in the same way as has been described for recognizing user intentions from the query dialogue. Once the barging-in utterance has been completed, the recognized intention(s) are preferably used to re-select a presentation scenario. Depending on the actual situation, it may not be required to repeat any information that has already been presented before. Instead, it may be sufficient to express just the information that still was to be presented. Preferably, the intention is also based on the moment at which the user barges in. Particularly in combination with the utterance, this may allow an accurate recognition of the intention of the user. For instance, if the user utters "No, not that" immediately after the system presented" . . . arriving in X at 20.00; leaving X at 20.15 . . . ", this may indicate that the user does not wish to obtain detailed changing-over information. It will be appreciated that the presentation manager 90 may, based on the barging-in intention, also leave out certain information items, for instance by leaving out any journey involving a change-over. Preferably, the system also checks the barge-in information to determine whether a new query item has been presented and, consequently, whether it is desired to obtain new information items from the storage 52.

In an embodiment according to the invention, the presentation manager 90 determines a measure of the complexity of the presentation of the information items if the selected presentation scenario were to be used for presenting the information. It will be appreciated that if no intention has been recognized yet, the selected scenario may be a default presentation scenario. The complexity may be determined by retrieving a complexity measure associated with the scenario from a storage. The storage comprises a respective complexity measure for each scenario of the set of possible scenarios. The complexity measure may be algorithmically adjusted, for instance, if a sub-scenario needs to be repeated for each direct trajectory of a journey which involves one or more change-overs. In such a situation a complexity measure may be stored for one trajectory or for different types of trajectories, such as a direct journey, a starting trajectory of a compound journey, an intermediate trajectory of a compound journey, and an end trajectory of a compound journey. A complexity for a journey involving several trajectories may be obtained by multiplying the complexity measure of each involved trajectory. The system compares the complexity measure to a predetermined threshold. If based on the comparison the sentence(s)/phrase(s) to be generated are judged too complex, the presentation manager 90 triggers outputting a question statement to the user for determining a more suitable presentation scenario. Such a question statement may include a phrase like "The journey involves X changes. Would you like to get all change-over details ?". The intention of the user (yes or no details) is determined from the reply to the question statement. This is preferably done by determining the intention specifiers from the recognized response in a way as described above.

Particularly, for a system which allows barging-in or is capable of asking more questions after the dialogue has been completed, it is preferred that the dialogue manager 50 handles extracting information from the utterances of the user as recognized by the speech recognition system 40. The dialogue manager 50 may also start new dialogues to obtain the information from the user.

Normally, the system 10 according to the invention is executed on a computer, such as a workstation or PC server. The tasks of the speech recognition system 40, the dialogue management system 50, the speech generation system 60, and the presentation management system 90 are executed on the microprocessor of the system under control of suitable programs.

Figure 2:
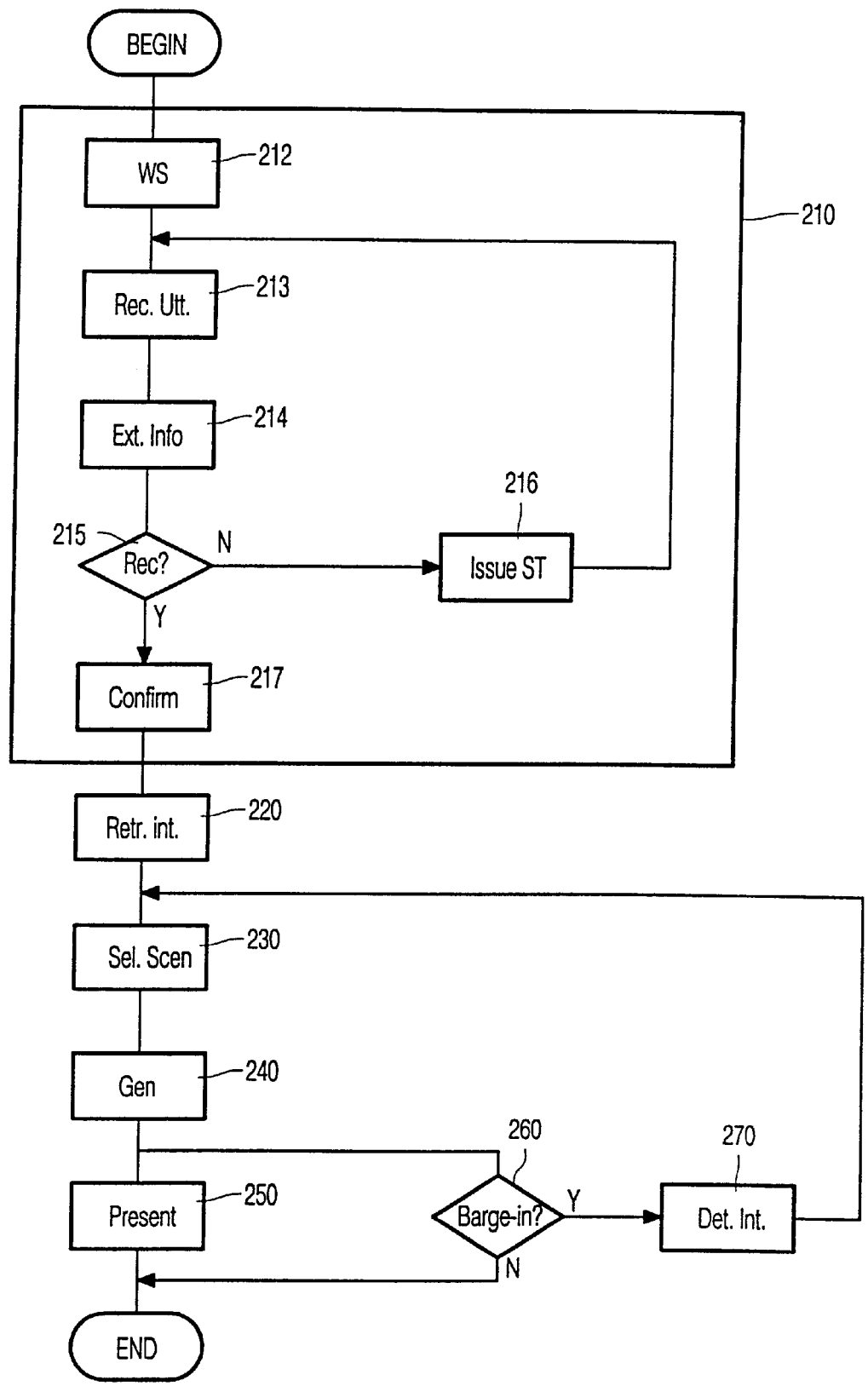
FIG. 2 illustrates a flow diagram of a method according to the invention.

FIG. 2 illustrates a flow diagram of the method according to the invention for automatically responding to an inquiry from a user. In step 210 a machine-controlled human-machine dialogue is executed to determine a plurality of pre-determined query items. The query items specify information to be retrieved and verbally presented to the user. The figure shows a dialogue which is subdivided in several steps. Initially a welcoming statement is presented in step 212. The welcoming statement preferably also includes a question requesting the user to specify which information the user wishes to retrieve. In step 213 the response of the user is recognized, using a conventional speech recognition technique. In step 214 the recognized utterance is scanned to extract information, such as specifying which information the user is interested in and, according to the invention, also to determine an intention of the user that affects the way the information is presented most effectively. In step 215 it is checked whether sufficient query items have been recognized so that a query can be performed to obtain the information. If not, a question statement is issued in step 216. The question may be combined with a confirmation statement to confirm any information recognized so far. The response of the user is recognized and handled as described for step 213. This results in a loop of sub-dialogues until sufficient information has been recognized. Optionally, a confirmation statement may be issued at step 217. After completion of the dialogue, at step 220 the information is retrieved from a storage. Information items are retrieved as specified by the recognized query items. At step 230, an intention of the user that affects the way the information is presented most effectively is selected from a predetermined set of such intentions. The selection is based on the information obtained from utterances of the user as recognized during the dialogue. A presentation scenario which matches the intention is retrieved. If no intention can yet be identified, a default scenario is selected. The selection of the scenario may also be based on the information to be presented. It will be appreciated that an intention as such may not be determined separately, and in fact the information recognized for the query specifiers is used to directly select a presentation scenario, where the scenarios have been pre-designed to reflect certain (combinations of) intentions of the user. In step 240, at least one phrase representing the obtained information items is generated according to the presentation scenario selected. In step 250, the generated phrase(s) are uttered. Optionally, barging-in of the user during the presentation may be supported. To this end, in parallel to presenting the speech, in step 260 it is detected whether or not the user is barging-in during the presentation. If not, the presentation finishes normally. If so, in step 270 information is extracted from the barging-in utterance and/or the moment of barging-in. The same techniques as used during the dialogue of step 210 may be used for this. At the end of the barging-in, the presentation phase may continue/restart in step 230 with selecting a presentation scenario by also taking the barging-in information into consideration. Optionally, the dialogue phase of step 210 may be re-entered.

What is claimed is:

1. A method for automatically responding to an inquiry from a user, comprising:

executing a machine-controlled human-machine dialogue to determine a plurality of predetermined query items specifying information to be verbally presented to the user;

retrieving a plurality of information items from a storage in dependence on the query items;

determining an intention of the user from a predetermined set of intentions, the intention reflecting a preferred way of presenting the information items;

selecting the verbal presentation scenario from a predetermined set of presentation scenarios in dependence on the determined intention, wherein the presentation scenarios are selected from the group consisting of semantic content of delivered information items, emphasis on or repetition of various information items, and tailoring of actual vocabulary used;

generating at least one natural language phrase to present the obtained information items according to a presentation scenario; and verbally presenting the generated phrase(s) to the user.

2. The method of claim 1, wherein the determination of an intention comprises determining which of the information items is/are important to the user.

3. The method of claim 2, further comprising nominating an information item as important if a corresponding query item occurs early in a user utterance relative to other query items.

4. The method of claim 2, wherein selection of the presentation scenario comprises selecting from the predetermined set of presentation scenarios a scenario wherein the information item(s) nominated as important is/are presented early in the phrase(s) relative to the other information items.

5. The method of claim 1, wherein the execution of the dialogue comprises:

outputting a question and/or a verifying statement from a statement repertoire to the user; and obtaining at least one response from the user;

said execution being continued until for a plurality of pre-determined query specifiers a respective query item has been recognized in the response(s); and wherein the determination of an intention comprises determining the intention from the response(s) of the user to a question and/or verifier statement.

6. The method of claim 5, where:

each of the intentions of the predetermined set of intentions is associated with a respective intention specifier;

at least one of the intention specifiers does not correspond to one of the query specifiers; and said method further comprising trying to recognize an intention for at least one of the intention specifiers in the response(s) during the dialogue.

7. The method of claim 6, further comprising selecting a default presentation scenario if no intention item has been recognized during the dialogue.

8. The method of claim 1, further comprising:

detecting that the user barges in during presentation of the generated phrases; and determining an intention of the user from a moment of the user barging in and/or a user barging-in utterance;

re-selecting a presentation scenario based on the intention of the user motivating his barging-in;

generating at least one phrase representing at least the not yet presented information items according to the selected presentation scenario; and verbally presenting the generated phrase(s) to the user.

9. The method of claim 1, wherein the method comprises:

comparing the complexity of a phrase representing the obtained information items according to a default or selected presentation scenario with a predetermined threshold; and if judged too complex, outputting a question statement to the user for determining a more suitable presentation scenario; and determining the intention of the user from a reply to the question statement.

10. The method of claim 1, wherein the set of intentions includes the intention of the user to write down the phrase and the intention of the user not to write down the phrase.

11. The method of claim 1, wherein the information items relate to traveling information and the set of intentions includes at least one of:

the intention to arrive at a predetermined time;

the intention to depart at a predetermined time; and the intention to have predetermined minimum changing-over time.

12. A system for automatically responding to an inquiry from a user; the system comprising:

a dialogue executor to execute a machine-controlled human-machine dialogue to determine a plurality of pre-determined query items specifying information to be verbally presented to the user;

a retriever to retrieve a plurality of information items from memory depending upon the query items;

a generator to generate at lest one natural language phrase to present the obtained information items according to a presentation scenario;

a verbal presentor to verbally present the generated phrase(s) to the user;

a determiner to determine a user's intention from a predetermined set of intentions based upon utterance(s) of the user; the intention reflecting a preferred way of presenting the information items; and a selector to select the verbal presentation scenario from a predetermined set of presentation scenarios in dependence on the determined intention.

13. An article comprising a computer readable medium having instructions stored thereon which when executed causes:

execution of a machine-controlled human-machine dialogue to determine a plurality of predetermined query items specifying information to be verbally presented to the user;

retrieval of a plurality of information items from memory depending upon the query items;

determination of an intention of the user from a predetermined set of intentions, the intention reflecting a preferred way of presentation of the information items;

selection of the verbal presentation scenario from a predetermined set of presentation scenarios depending upon the determined intention, wherein the presentation scenarios are selected from the group consisting of semantic content of delivered information items, emphasis on or repetition of various informational items, and tailoring of actual vocabulary used;

generation of at least one natural language phrase to present the retrieved information items according to the presentation scenario; and verbally presenting the generated phrase(s) to the user.

* * * * *